April 13, 1965         J. J. JAMES         3,177,542
CLAMPING DEVICE
Filed June 12, 1962                         2 Sheets-Sheet 1
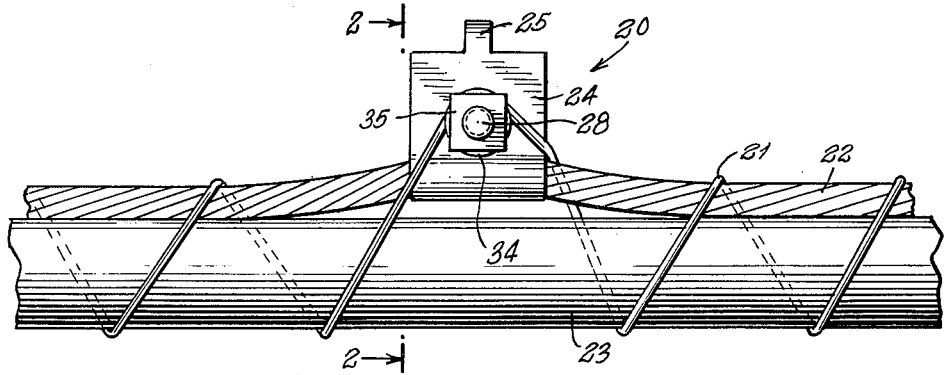
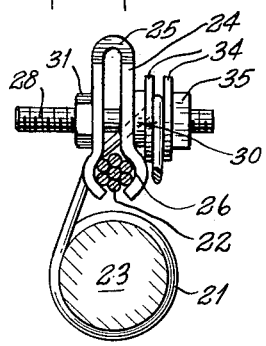
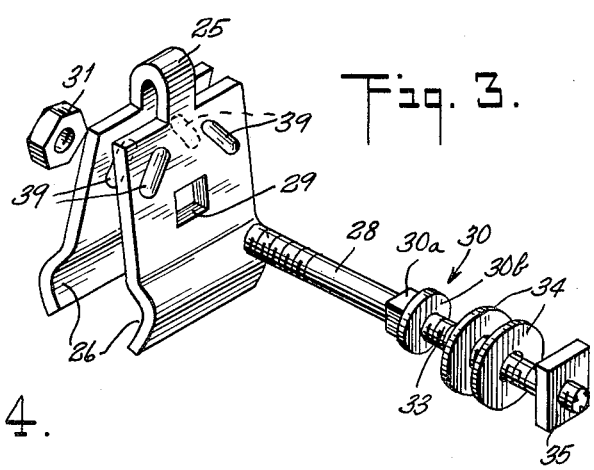
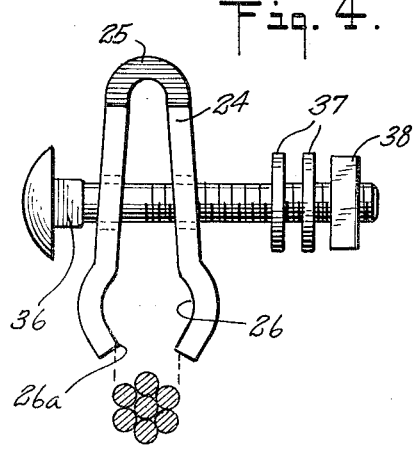
INVENTOR.
JOHN J. JAMES
BY
ATTORNEYS April 13, 1965     J. J. JAMES     3,177,542
CLAMPING DEVICE Filed June 12, 1962     2 Sheets-Sheet 2

INVENTOR.
JOHN J. JAMES
BY
                 ATTORNEYS

United States Patent Office 3,177,542
Patented Apr. 13, 1965

3,177,542
CLAMPING DEVICE
John J. James, Cranford, N.J., assignor to Diamond Expansion Bolt Co., Inc., Garwood, N.J., a corporation of New Jersey
Filed June 12, 1962, Ser. No. 201,964
3 Claims. (Cl. 24—125)

The invention relates to a device for securing one object adjacent to another and more particularly to a device having clamping members yieldably supported with respect to one another for a limited extent of travel.

A common method of supporting an aerial cable is to suspend the cable from a messenger which is a wire rope or cable having sufficient structural strength to support another cable attached to it along its length. With this arrangement it is possible to design the supported cable primarily from the considerations of the required number of conductors, current carrying capacity, low electrical resistance, insulation, etc. since the need of structural strength is substantially eliminated by transferring the load to the messenger. The messenger can be of galvanized steel, plated steel, or hard drawn copper construction.

For suspending the cable from the messenger, a wide variety of supporting devices have been employed. Copper, zinc, or bronze strap-type hangers have been used to attach the cable to the messenger at intervals along its length. The strap-type hangers in many applications were found to be costly because of the material requirements needed for corrosion resistance as well as the difficulty in fabricating the messenger and cable assembly. A later form of hanger which has been found to be highly satisfactory is the continuous spiral hanger. With this arrangement, the messenger is disposed adjacent to the cable and the spiral type hanger which is a form of a binding of wire or tape is wound about the messenger and cable. The wire form of the spiral type hanger which is known as lashing wire is normally applied in the field by a simple machine.

The method of attaching messenger supported cables to poles is generally similar to that developed for the suspension of conventional cables. In the installation of messenger suspended cables it is often necessary to clamp the lashing wire to the messenger. Such a clamp, designated a lashing clamp, may be required whenever the cable is terminated or where it is necessary to remove the cable from adjacent the messenger for a given distance such as adjacent the messenger bracket on a pole. At locations where taps are made into the cable, it may also be necessary to interrupt the lashing wire so that the lashing wire must be clamped to the messenger.

The installation of aerial cables is inherently a difficult operation since the lineman must work from a confined elevated platform or from the supporting pole or tower itself. In order to safeguard the worker and to enable him to work in the most efficient manner it is essential that the various components related to the support of the cable be designed with the difficult working conditions in mind. Devices comprising a great plurality of parts which are difficult to assemble and readily dropped or lost must be avoided. Thus one of the most important design considerations is that the components are adapted to be conveniently and readily installed and in many cases with the use of a single hand.

An object of the present invention is to provide a clamping device which includes spaced apart clamping members yieldably supported with respect to one another in order to facilitate installation onto the object to be engaged.

Another object of the invention is to provide a clamping device in which the movement of the clamping members with respect to the object being engaged is limited.

A further object of the invention is to provide a clamping device which can be simply and conveniently secured in its final operative position with respect to the object being engaged.

A still further object of the invention is to provide a clamping device adapted for securing a lashing wire to a cable messenger.

In one embodiment of the invention, the clamp or device for engaging an object comprises a pair of clamping members which are yieldably supported, spaced apart, and facing one another. A screw member extending through aligned openings in the clamping members enables the clamp to be engaged with the object to which it is to be attached. Projections or bosses are provided on the adjacent surfaces of the clamping members to limit the movement of one clamping member toward the other to prevent the application of excessive force to the object being engaged.

In another embodiment of the invention the screw which extends through the openings in the clamping members is adapted to engage the lashing wire in order to clamp it.

In a further embodiment of the invention the clamping members are provided with grooved portions adapted to engage and to substantially conform to the object which is to be engaged by the clamp.

In another embodiment of the invention, the grooved portions of the clamping members are conditioned to increase the frictional engagement with the object disposed therein.

Other objects and features will become apparent in the following description and claims and in the drawings in which:

FIG. 1 is a front elevational view of the clamp of the invention engaged with the messenger and lashing wire of an aerial cable;

FIG. 2 is a vertical section view taken along the line 2—2 in FIG. 1 and showing the engagement of the clamp with the messenger and hanger wire;

FIG. 3 is an exploded perspective view of the clamp of the invention showing the clamping members and screw;

FIG. 4 is a vertical section view of the clamp of the invention showing the clamp adjacent to the messenger to which it is to be attached;

Figure 5:
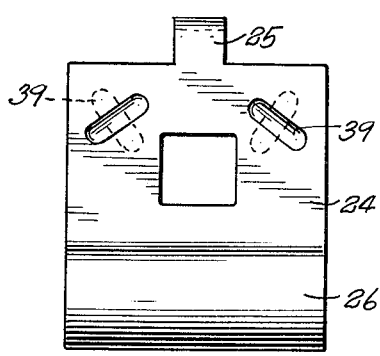
FIG. 5 is a front elevational view of the clamping members showing the relation of the projections which serve as limit stops.
Figure 8:
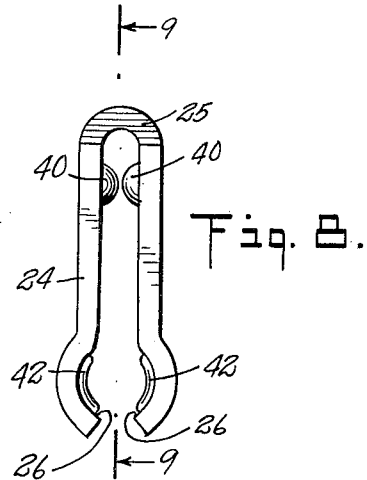
FIG. 8 is a vertical section view of clamping members having lugs in their grooved portions.

The clamping device of the invention or lashing clamp 20 is shown in FIG. 1 attached to lashing wire 21 and messenger 22 of suspended cable 23. As shown in FIGS. 2 and 3 lashing clamp 20 includes clamping or plate members 24 which are spaced apart in a facing relationship by yieldable hinge or web 25. Substantially opposite web 25 there is provided in the plate members grooved portions 26 which are adapted to receive an object to be clamped such as messenger 22. The contour of the grooved portion is shaped to substantially conform to the portions of the messenger adjacent thereto.

In free position, web 25 supports the plate members spaced apart from and facing one another. The yieldable lug can be resilient or adapted to bend in order to facilitate installation. The plate members and web may be produced from a flat strip of metal by stamping and punching operations. During manufacture the plate members are moved to a position adjacent one another by bending web 25. The plate members in the free position diverge from the web so that a slot or gap is formed adjacent the free edges at grooved portion 26. As shown in FIG. 4 the spacing between the inner portion of edges 26a is of a dimension that will enable the plate members to be slipped over messenger 22. The spacing can be dimensioned to engage the messenger with a close fit. The advantage of this close fit is that it enables the lineman to engage the clamp initially with the messenger without any chance of it subsequently disengaging before it is tightened in place. In addition the close fit of the clamp with the messenger reduces the amount of movement of the plate members necessary to clamp them onto the messenger.

The means for urging one plate member toward the other during installation of the lashing clamp is screw 28 which is adapted to extend through opening 29 in each of the plate members. To limit the motion of the screw with respect to the plate members screw 28 is provided with head 30 having lug 30a and shoulder 30b similar to that of a carriage bolt. When the screw is installed through openings 29, lug 30a becomes engaged with the opening of one of the plate members and shoulder 30b is positioned in contact with the outer surface of the plate member. Tightening of nut 31 urges the plate members toward one another so that they clamp about messenger 22 and secure the lashing clamp to it.

As shown in FIG. 3 the additional clamping means, besides that of grooved portion 26 in the plate members, is provided by threaded stud 33 extending from shoulder 30b of screw 28. The threaded stud is provided with a pair of flat washers 34 between which an additional object to be clamped such as lashing wire 21 can be disposed. Installation of nut 35 clamps washers 34 against lashing wire 21. In certain installations the lashing wire may be stretched about threaded stud 33 and clamped as shown in FIG. 1. In other applications where it is necessary to terminate the lashing wire, the lashing wire can be cut and unwound from about the messenger and cable assembly and then wound about threaded stud 33 to secure it before being clamped between the flat washers. In order to insure that the nuts and washers remain together with the screw and stud before installation, the ends of the screw and stud are staked.

In another embodiment of the invention the means for urging the plate members toward one another is carriage bolt 36 having flat washers 37 and nut 38. With this arrangement it is necessary to engage the object to be clamped, such as the lashing wire, between the flat washers before nut 38 is driven in order to close the plate members about messenger 22 and at the same time to clamp the lashing wire between the washers. It can be seen that in either of the embodiments of FIGS. 3 and 4 the lashing clamp can be loosely assembled with all of its parts at the point of manufacture in order that there is no need in the field for the lineman or other worker to handle detailed parts or to make sub-assemblies prior to actual installation of the clamp. In addition the arrangement of the carriage bolt type head facilitates assembly since it prevents rotation of the screw member.

Figure 6:
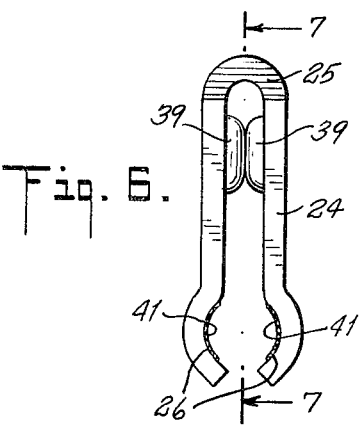
FIG. 6 is a vertical section view of the clamping members showing the projections in their limiting position.
Figure 9:
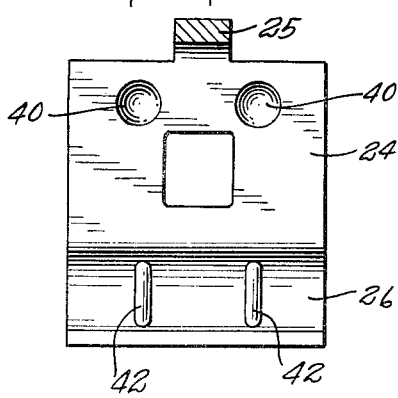
FIG. 9 is a vertical section view taken along the line 9—9 in FIG. 8 and showing the lugs within the grooved portion of the clamping member.
Figure 7:
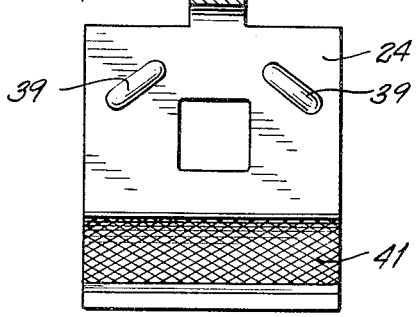
FIG. 7 is a vertical section view of a clamping member taken along the line 7—7 in FIG. 6 and showing the serrated grooved portion.

Projections 39 can be disposed upon the inner adjacent surfaces of plates 24 in order to serve as the means for limiting the movement of one plate with respect to the other (FIGS. 5–7). Projections 39 having an oblong or ridge-like form are disposed on the adjacent plates in a manner such that they substantially overlie one another when the clamp is placed in its operative position. In another embodiment the projections on one plate can be disposed substantially at right angles to those of the other plate with the result that the projections cross one another when the clamp is installed. As shown in FIG. 6, projections 39 engage one another when grooved portions 26 of the plates are positioned at a predetermined distance from one another. This arrangement limits the engaging forces of the clamp with respect to messenger 22 so that the messenger is not excessively deformed or crushed. A more rigid arrangement results since, as shown in FIG. 2, the installed clamp comprises two plates which are supported by the engaged projections as well as the messenger. Thus the plates serve substantially as end supported beams loaded by screw 28 and nut 31.

Instead of oblong projections, plates 24 can be provided with hemispherical projections 40 which are disposed opposite one another. As with the oblong projections, the hemispherical ones limit the extent of travel of one plate with respect to the other when it is installed. In the installed position, the loading of the screw is carried by the engaging forces on the hemispherical projections as well as by the resistance of the messenger to crushing.

In order to prevent any tendency for the messenger to slide or move within grooved portion 26, the grooved portion is provided with knurled surface 41 as shown in FIG. 7. With the lashing wire engaged by the flat washers and perhaps wound about threaded stud 33 and with the engagement of the knurled surface with the messenger, it is evident that clamp 20 rigidly lashes the lashing wire to the messenger so that no relative motion can take place. Instead of knurled surface 41, the inner surface of grooved portion 26 can be provided with ridges 42 which are adapted to provide a tight grip with messenger 22.

The clamp as well as the screw, washers and nuts can be fabricated from steel or other material having sufficient mechanical properties to enable the clamp to apply sufficient engaging forces with the messenger and lashing wire. By the proper selection of the thickness and width of web 25 the plates may be supported in a yieldable manner with respect to one another, that is the web may be resilient or adapted to be bent during installation. For outdoor applications the steel clamp assembly is galvanized for corrosion resistance. In addition stainless steel and other corrosion resistant alloys can be employed.

While certain embodiments of the invention have been shown and described herein, it is to be understood that certain changes, additions and substitutions may be made without departing from the scope and spirit of the invention.

I claim:

1. A clamping device comprising a pair of plate members each having an opening extending therethrough and a grooved portion adjacent an edge portion thereof, a yieldable web connected to each of said plate members adjacent another edge portion thereof disposed opposite said edge portion, said web supporting said plate members in a spaced apart facing relationship with said openings substantially in alignment and with said grooved portions extending substantially parallel to and in a facing relationship with one another, said web being disposed substantially between planes contiguous to the portion of the outer surface of said plate members adjacent said other edge portion thereof, a bolt disposed in said openings for urging said plate members toward one another to engage an object disposed in said grooved portions, and a pair of oblong projections disposed on each facing surface of said plate members spaced apart from one another between said other edge portion and said opening therein, said projections of each pair converging toward one another with the length of each projection forming a common predetermined angle with the central axis of said plate member related thereto, whereby said pairs of projections are adapted to engage one another along the length thereof to limit the movement of said plate members toward one another.

2. A clamping device comprising a pair of plate members each having an opening extending therethrough and a grooved portion adjacent an edge portion thereof, a yieldable web connected to each of said plate members adjacent another edge portion thereof disposed opposite said edge portion, said web supporting said plate members in a spaced apart facing relationship with said openings substantially in alignment, said web being disposed substantially between planes contiguous to the portion of the outer surface of said plate members adjacent said other edge portion thereof, a bolt disposed in said openings for urging said plate members toward one another to engage an object disposed in said grooved portions, and an oblong projection disposed on each facing surface of said plate members adjacent said other edge portion and adapted to engage one another with the length of one at substantially right angles to the other to limit the movement of said plate members toward one another.

3. A clamping device comprising a pair of plate members each having an opening extending therethrough and a grooved portion adjacent an edge portion thereof, a yieldable web connected to each of said plate members adjacent another edge portion thereof disposed opposite said edge portion, said web supporting said plate members in a spaced apart facing relationship with said openings substantially in alignment and with said grooved portions extending substantially parallel to and in a facing relationship with one another, a bolt disposed in said openings for urging said plate members toward one another to engage an object disposed in said grooved portions, said bolt having a head portion adapted to engage the outer surface of one of said plate members, a plurality of projections disposed on facing surfaces of said plate members adjacent said other edge portion and adapted to engage one another to limit the movement of said plate members toward one another, and a screw device extending from the head of said bolt for engaging an additional object.

References Cited by the Examiner

UNITED STATES PATENTS

| | | | |
|---|---|---|---|
| 430,755 | 6/90 | Robischung | 24—135 |
| 585,269 | 6/97 | Hesse | 248—230 |
| 1,266,933 | 5/18 | Gardner | 24—135 |
| 1,453,173 | 4/23 | Pairard | 24—243.2 |
| 1,802,046 | 4/31 | Bower | 248—61 |
| 2,144,140 | 1/39 | Batcheller | 24—259 |
| 2,276,086 | 3/42 | Peregallo | 24—259 |
| 2,368,898 | 2/45 | Swift | 248—226 |
| 2,504,360 | 4/50 | Van Auken | 248—61 |
| 2,511,806 | 6/50 | Macy. | |
| 2,607,976 | 8/52 | Zahel | 24—205.15 |
| 2,612,735 | 10/52 | Lea | 269—157 |
| 2,849,777 | 9/58 | Ridgers et al. | 24—248 |
| 2,959,295 | 11/60 | Howard et al. | 248—226 |

FOREIGN PATENTS 106,956  6/17  Great Britain.

DONLEY J. STOCKING, *Primary Examiner.*

ABRAHAM G. STONE, *Examiner.*